(12) United States Patent
Woellper

(10) Patent No.: US 12,104,368 B2
(45) Date of Patent: Oct. 1, 2024

(54) LAYERED PANELS

(71) Applicant: Merged Materials, Hudsonville, MI (US)

(72) Inventor: Randolph Woellper, Hudsonville, MI (US)

(73) Assignee: Merged Materials, Hudsonville, MI (US)

( * ) Notice: Subject to any disclaimer, the term of this patent is extended or adjusted under 35 U.S.C. 154(b) by 0 days.

(21) Appl. No.: 18/202,159

(22) Filed: May 25, 2023

(65) Prior Publication Data

US 2023/0295915 A1 Sep. 21, 2023

Related U.S. Application Data

(63) Continuation-in-part of application No. 17/809,725, filed on Jun. 29, 2022, now abandoned.

(60) Provisional application No. 63/282,029, filed on Nov. 22, 2021.

(51) Int. Cl.
*E04B 1/14* (2006.01)
*B32B 3/08* (2006.01)
(Continued)

(52) U.S. Cl.
CPC .................. *E04B 1/14* (2013.01); *B32B 3/08* (2013.01); *B32B 3/12* (2013.01); *B32B 29/005* (2013.01);
(Continued)

(58) Field of Classification Search
CPC .. E04B 1/14; E04B 3/7015; E04B 2003/7023; E04B 2003/7086; B32B 3/04;
(Continued)

(56) References Cited

U.S. PATENT DOCUMENTS 4,133,930 A 1/1979 Wright
4,680,216 A 7/1987 Jacaruso
(Continued)

FOREIGN PATENT DOCUMENTS

CN 204020896 U * 12/2014
KR 20210133408 A 11/2021
WO 2017182471 A1 10/2017

OTHER PUBLICATIONS

Translation of CN204020896U. (Year: 2014).*
(Continued)

*Primary Examiner* — Catherine A. Simone
(74) *Attorney, Agent, or Firm* — Gunther J. Evanina; BUTZEL LONG

(57) ABSTRACT

A composite panel exhibiting high flexural strength while reducing mass as compared with conventional composite panels is provided. The improved panel includes a rigid frame having outer edges defining a perimeter of the panel and inner edges defining a perimeter of a structural filler chamber, wherein the frame has a thickness at its outer edges that is narrower than at its inner edges; first and second sheet-like material layers bonded to opposite sides of the rigid frame to define, together with the inner edges of the rigid frame, a volume of the structural filler chamber; and a structural filler disposed in the chamber to provide compressive strength between the sheet-like material layers.

10 Claims, 10 Drawing Sheets

(51) Int. Cl.
 *B32B 3/12* (2006.01)
 *B32B 29/00* (2006.01)

(52) U.S. Cl.
 CPC ........ *B32B 29/007* (2013.01); *B32B 2250/03* (2013.01); *B32B 2250/26* (2013.01); *B32B 2260/028* (2013.01); *B32B 2260/046* (2013.01); *B32B 2307/546* (2013.01); *B32B 2307/72* (2013.01); *B32B 2607/00* (2013.01)

(58) Field of Classification Search
 CPC .... B32B 3/08; B32B 3/12; B32B 5/08; B32B 5/18; B32B 5/24; B32B 29/005; B32B 29/007; B32B 2250/03; B32B 2250/26; B32B 2260/028; B32B 2260/046; B32B 2307/546; B32B 2307/72; B32B 2607/00; B32B 2479/00; E04C 2/26; E04C 2/34; E04C 2002/3488; E04C 2/388; A47B 96/201; A47B 96/205; A47B 96/206; A47G 27/0231; A47G 27/0218
 USPC .......................................... 428/71, 121, 192
 See application file for complete search history.

(56) References Cited

U.S. PATENT DOCUMENTS

| | | | |
|---|---|---|---|
| 6,250,001 | B1 | 6/2001 | Gillespie |
| 7,871,055 | B1 | 1/2011 | Dagher |
| 8,323,786 | B2 | 12/2012 | Kanao |
| 8,777,161 | B2 | 7/2014 | Pollock |
| 10,676,927 | B2 | 6/2020 | Mathieu |
| 2006/0177626 | A1 | 8/2006 | Johnson |
| 2008/0138584 | A1* | 6/2008 | Grose ...................... B32B 5/12 |
| | | | 428/156 |
| 2011/0318523 | A1 | 12/2011 | Todd |
| 2012/0199292 | A1 | 8/2012 | Bremmer |
| 2015/0075318 | A1 | 3/2015 | Johnson |
| 2015/0239146 | A1 | 8/2015 | Neubauer |
| 2015/0258763 | A1 | 9/2015 | Daggett |
| 2016/0090517 | A1 | 3/2016 | Wroblewski |
| 2017/0273490 | A1 | 9/2017 | McMahan |
| 2018/0016781 | A1 | 1/2018 | Fox |
| 2020/0377191 | A1 | 12/2020 | Song |

OTHER PUBLICATIONS

Fraunhofer-Gesellschaft, Wood-derived foam materials, Apr. 29, 2015, https://phys.org/news/2015-04-wood-derived-foam-materials.html (Year: 2015).

Overview of materials for Epoxy/Carbon Fiber Composite, Mar. 20, 2023, https://www.matweb.com/search/datasheet.aspx?matguid=39e40851fc164b6c9bda29d798bf3726&ckck=1( (Year: 2023).

Dahle, Gregory, Aaron Carpenter, and David DeVallance. "Non-destructive measurement of the modulus of elasticity of wood using acoustical stress waves." Arboric Urban For 42 (2016): 227-233.

* cited by examiner

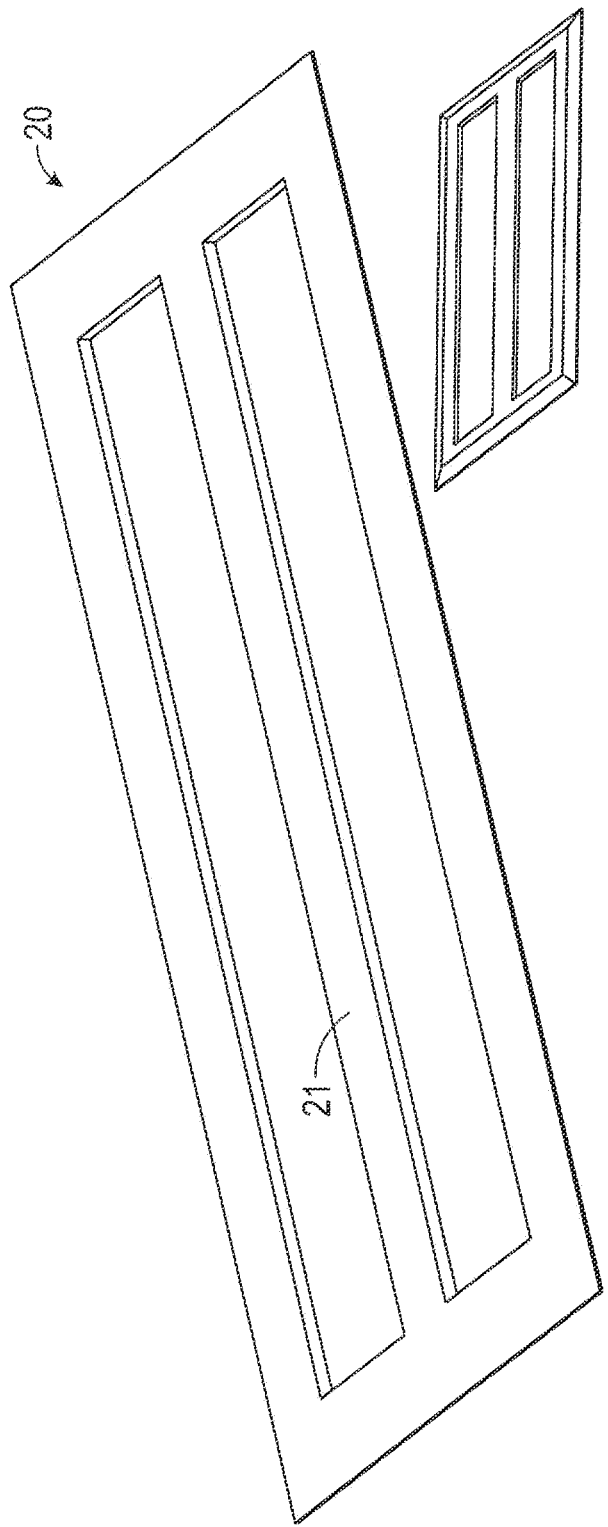

LAYERED PANELS

CROSS-REFERENCE TO RELATED APPLICATIONS

This application is a continuation-in-part of application Ser. No. 17/809,725 filed on Jun. 29, 2022, which claims benefit of provisional Application No. 63/282,029, filed on Nov. 22, 2021, both of which are incorporated herein by reference in their entirety.

FIELD OF THE DISCLOSURE

The present disclosure relates to panels. More specifically, the present disclosure is a multi-layered construction panel.

BACKGROUND OF THE DISCLOSURE

There are many different panels that are utilized in the construction industry. Depending on the project, different panels may be used to best fit the need of the specified project. Panels are typically constructed of high tensile-strength sheets from many materials such as laminate, veneers, tensioned extrusions, etc. Panels are used in many applications such as privacy panels, work surfaces, office panels, tabletops, credenza tops, desktops, and marker boards, etc.

SUMMARY OF THE DISCLOSURE

The disclosed composite panels are designed to exhibit improved flexural strength (i.e., the ability to resist deformation under load) while reducing mass, as compared with conventional composite panels.

The improved composite panels include a rigid frame having outer edges that define a perimeter of the composite panel and inner edges that define a perimeter of a structural filler chamber. The rigid frame has a narrower thickness at its outer edges than at its inner edges. A first sheet-like material layer is bonded with a first (bottom) side of the rigid frame, and a second sheet-like material layer is bonded with an opposite (top) side of the rigid frame, with the second sheet-like material layer having a flat top surface and ramped edge sections that are curved or sloped away from the flat top surface and toward thinner outer edges of the rigid frame. The first and second sheet-like material layers together with the inner edges of the rigid frame define a volume of the structural filler chamber. A structural filler is disposed in the structural filler chamber to provide compressive strength between the sheet-like material layers.

BRIEF DESCRIPTION OF THE DRAWINGS

FIG. 10 is a prospective view of an alternative design using a rigid frame base section having an internal rib for added strength.

DETAILED DESCRIPTION

All illustrations of the drawings are for the purpose of describing selected versions of the disclosed panels and are not intended to limit the scope of the claims.

The disclosed composite panels are strong, lightweight, aesthetic and exhibit antimicrobial efficacy.

Figure 1:
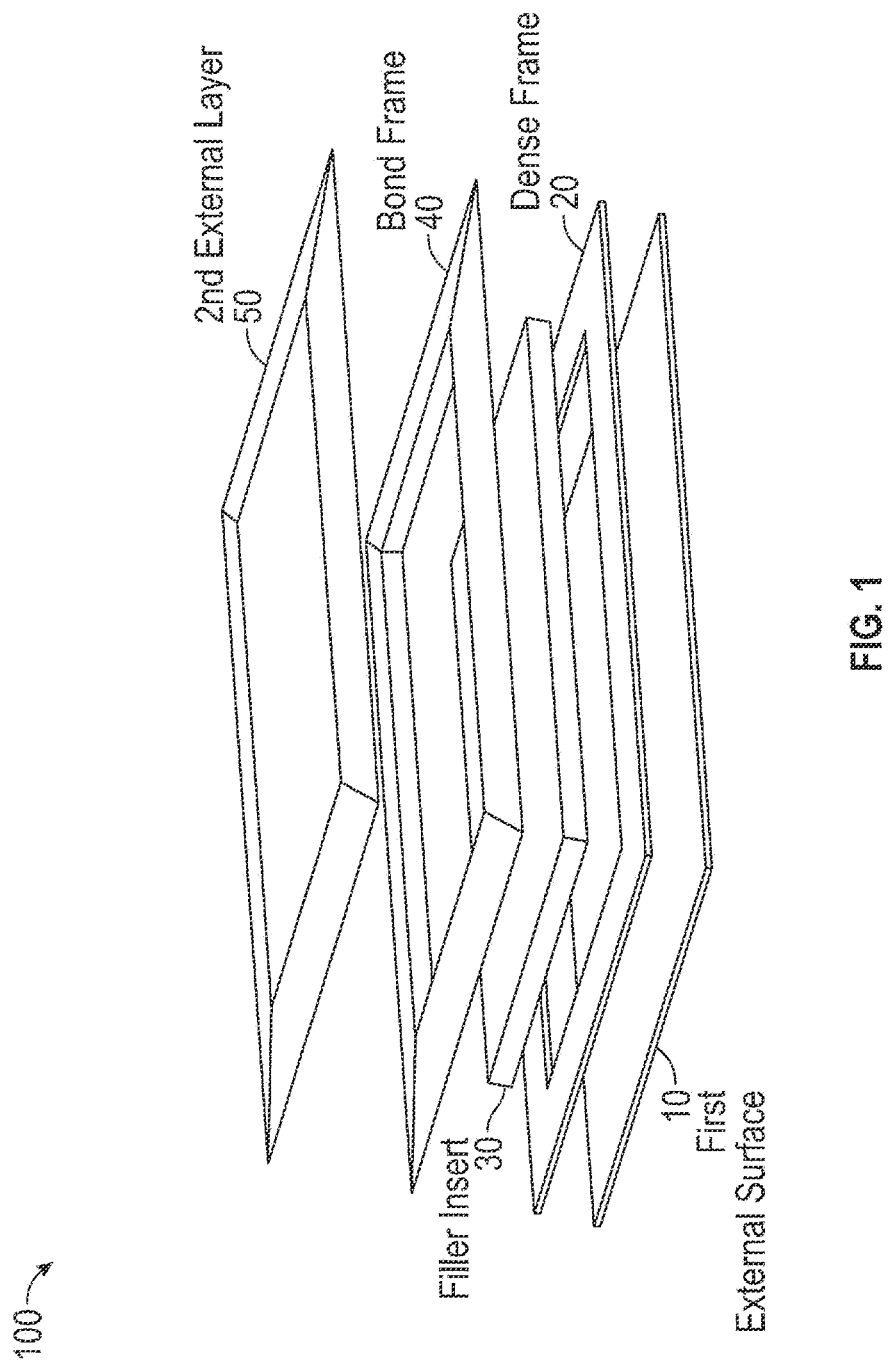
FIG. 1 is an exploded view of a composite panel in accordance with this disclosure.

In reference to FIG. 1, a composite panel 100 is shown in an exploded configuration. Panel 100 includes first sheet-like material layer 10, a first frame section 20, a structural filler insert 30, a second frame section 40, and second sheet-like material layer 50.

Figure 2:
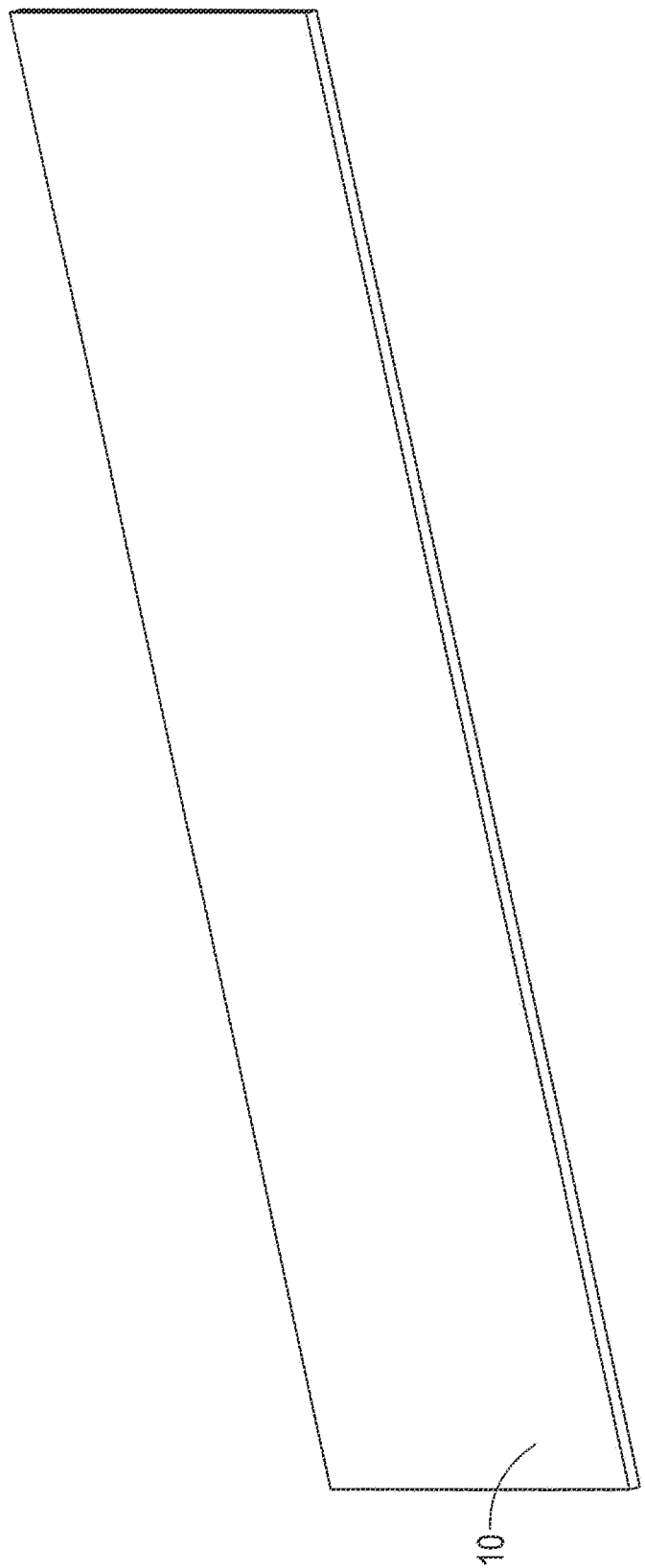
FIG. 2 is an illustration of one embodiment of the first sheet-like material layer of the composite panel.

As can be seen in FIG. 2, first sheet-like material layer 10 can be a thin, flat, planar sheet. The term "sheet-like" as used herein can mean a material having length and width dimensions that are much larger than the thickness of the material, and wherein the thickness is much less than the length and width of the material (e.g., thickness is less than 10%, less than 5% or less than 1% of the length and width of the sheet-like material layer), and wherein the thickness is uniform along the length and width of the sheet-like material.

Figure 3:
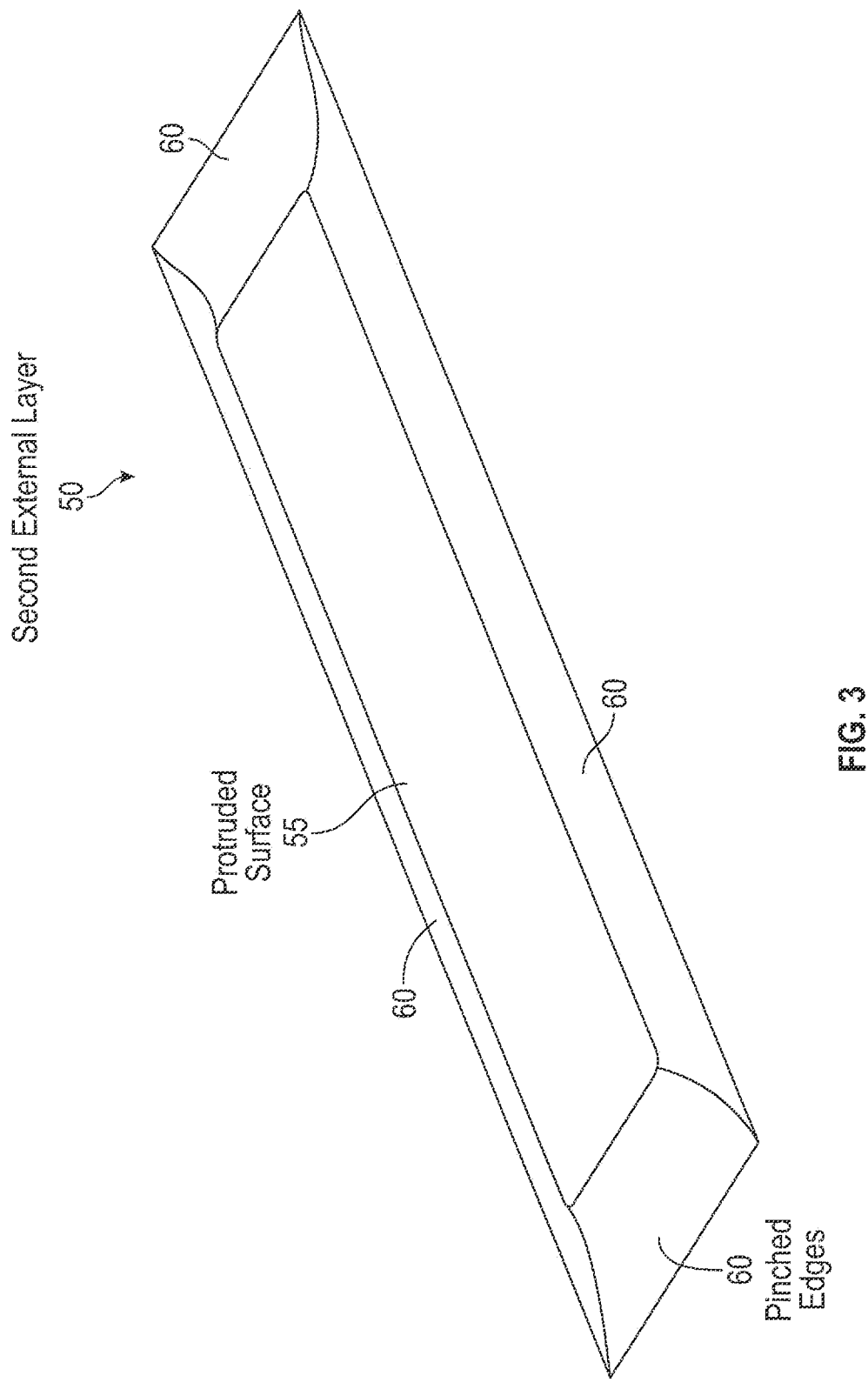
FIG. 3 is an illustration of one embodiment of the second sheet-like material layer of the composite panel after it has been shaped during bonding to the rigid frame and structural filler insert.
Figure 4:
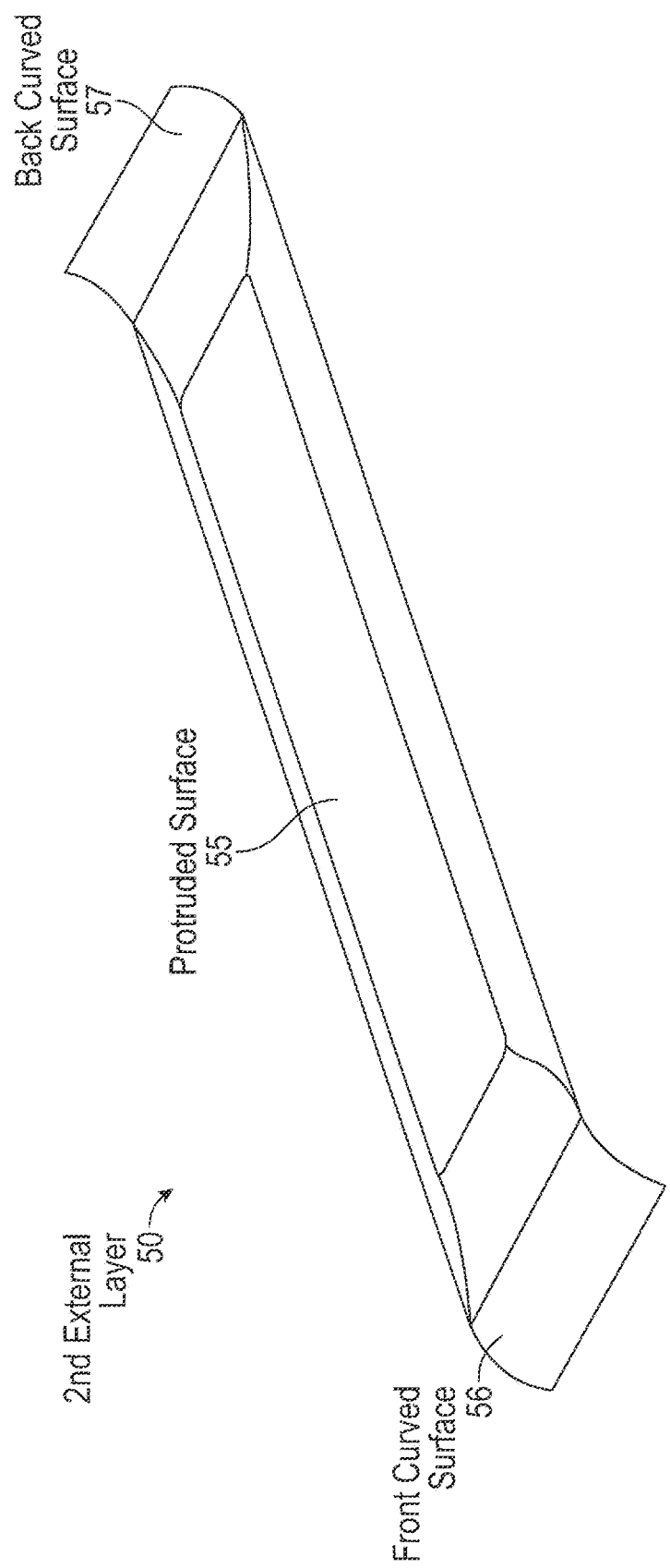
FIG. 4 is an illustration of one embodiment of the composite panel having a front curved surface and back curved surface.

The second sheet-like material layer can have a flat central surface 55 and curved or inclined edge surfaces 60, as shown in FIG. 3.

In accordance with an optional aspect of this disclosure, in certain applications, such as desktops, the composite panel can be provided with curved edges 56, 57. For example, a first edge could be curved downwardly from the front of a desktop to eliminate sharp edges where a user may wish to place their hand, and an upwardly curved rear edge that could prevent writing implements or other items from rolling off the desktop. Additionally, the curves provide added flexural strength without adding significant weight or cost, similar to the added strength of an angle iron as compared to a strap.

Figure 5:
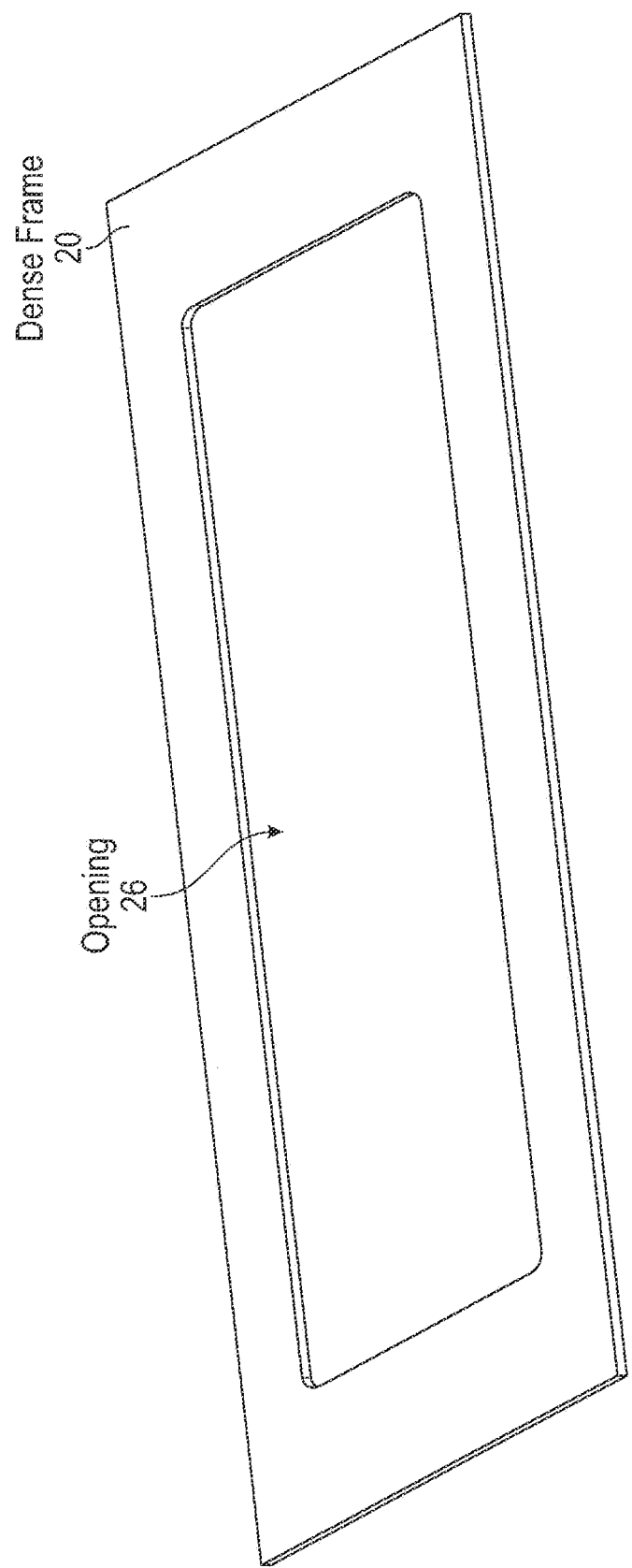
FIG. 5 is an illustration of one embodiment of the frame and the present invention.

As shown in FIG. 5, first frame section 20 defines an opening 26. Outer edges of the first frame section 20 generally define the perimeter of the composite panel. For enhanced strength, first base section 20 can be provided with an internal rib 21 as shown in FIG. 10.

Figure 7:
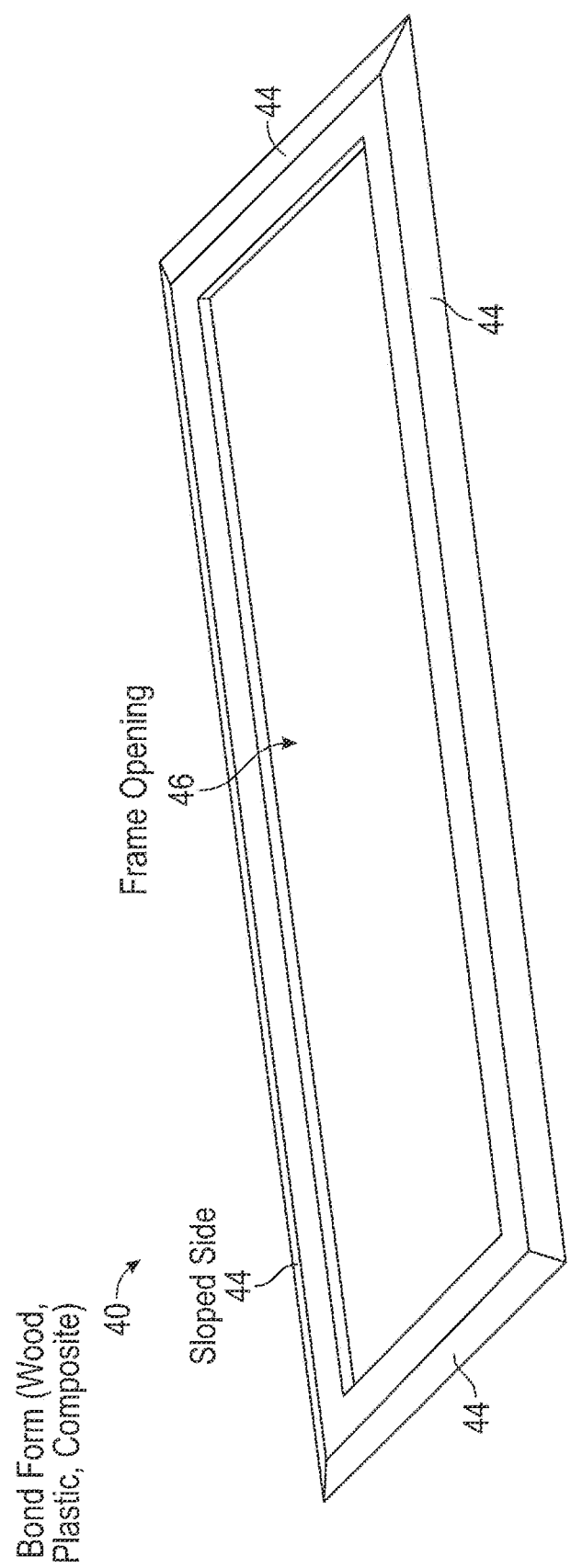
FIG. 7 is an illustration showing one embodiment of the sloped sides of the bond frame of the present invention.
Figure 8:
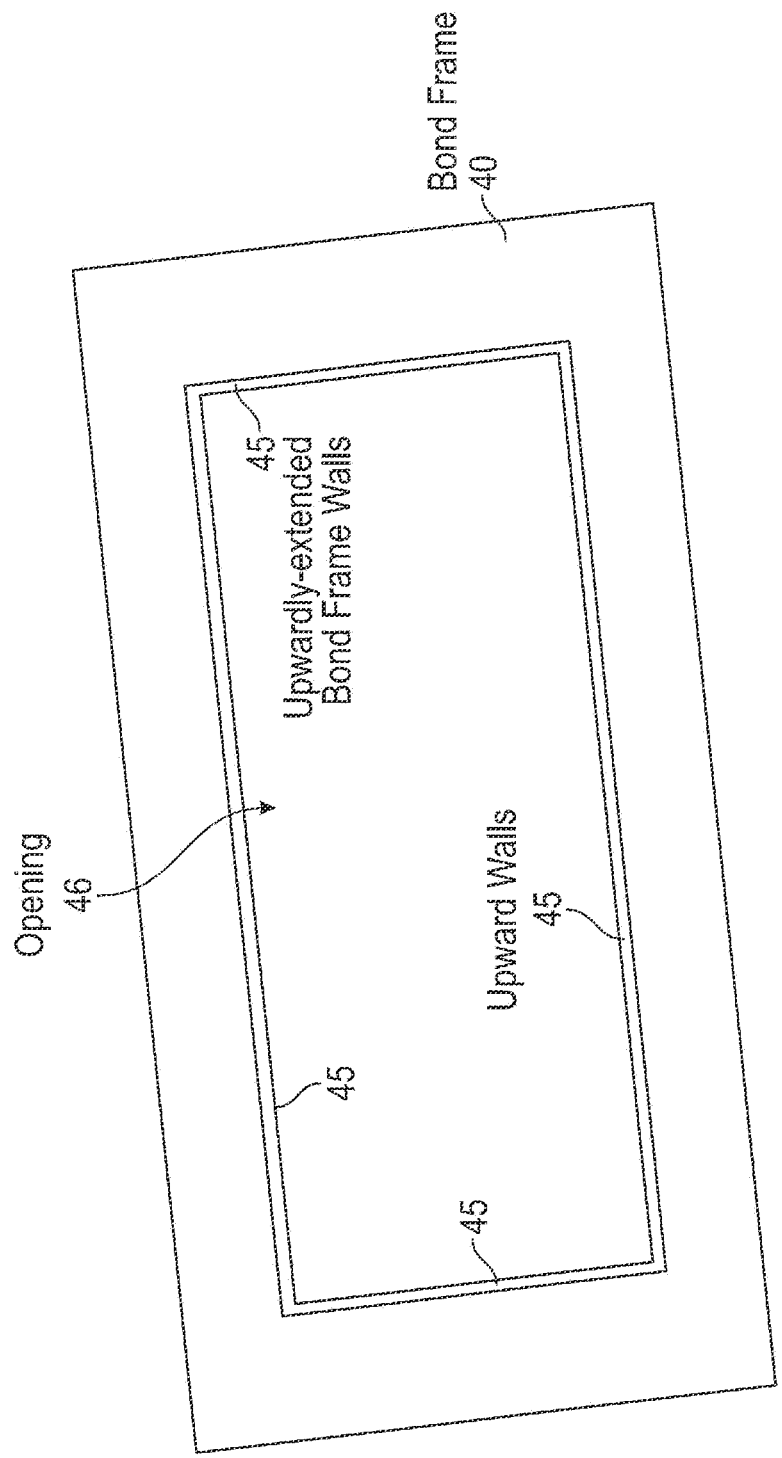
FIG. 8 is an illustration of one embodiment of a bottom surface of the bond frame with upwardly-extending bond frame walls.

Shown in FIGS. 7 and 8 is the second frame section 40. Second frame section 40 can include sloped outer edges 44 and have inner edges 45 defining an opening 46.

Second frame section 40 and first frame section 20 together define a rigid frame. First frame section 20 and second frame section 40 can be separately fabricated components that are joined together (e.g., with adhesives or mechanical fasteners such as screws), or can be fabricated together as a unitary structural component, such as from fiber (e.g., glass fiber) reinforced thermoset composites.

Figure 6:
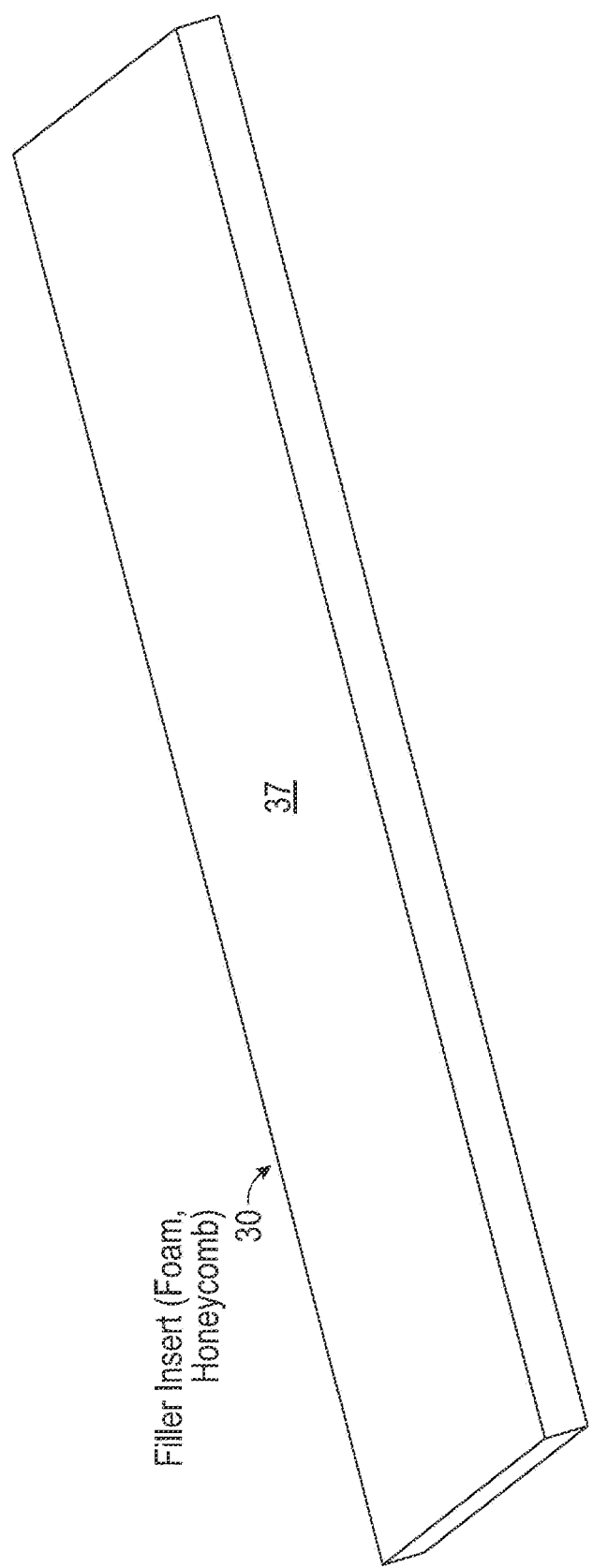
FIG. 6 is an illustration of one embodiment of the filler insert of the present invention.
Figure 9:
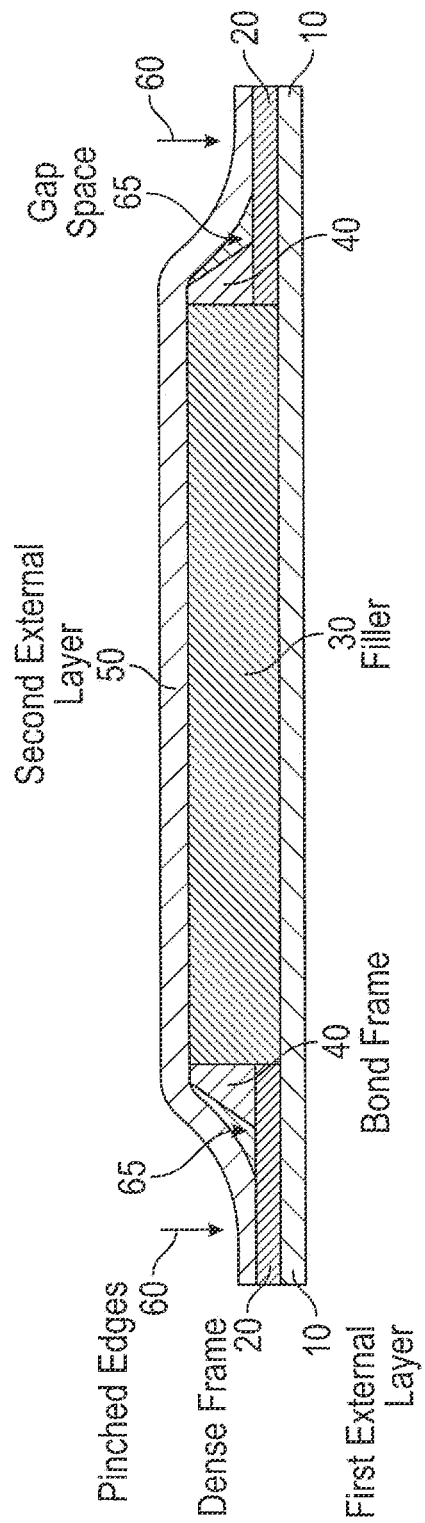
FIG. 9 is a cross-sectional view of one embodiment of the present invention with a gap space.

Structural filler 30 (shown in FIGS. 1, 6 and 9) is disposed within a volume or chamber defined by inner edges 25, 45 of rigid frame sections 20 and 40 respectively, and by first and second sheet-like material layers 10 and 50. Structural filler 30 is a lightweight material that exhibits sufficient compressive strength to eliminate a need for strengtheners or other high density structural members while preventing deformation of layers 10 and 50 when forces are applied at areas overlying the structural filler. Suitable low density, high strength materials that can serve as structural filler 30 include various polymeric foams (e.g., polypropylene foams, polyurethane foams) and honey comb-life structures (e.g., resin-impregnated aramid paper) that have a density of from about 20 to about 30 kg/m$^3$ and a compressive strength of from about 50 to 200 kPa.

The frame sections 20 and 40 (or rigid frame of unity structure) are rigid materials typically having a high modulus of elasticity (e.g., from about 800,000 psi to about 2,500,000 psi or higher) and a high modulus of rupture (from about 5,000 psi to about 15,000 psi or higher). Suitable materials include woods (e.g., douglas fir, sitka spruce, white pine, red pine, red oak, red maple, white oak, black walnut), plastics (e.g., ABS, acetal copolymers, acrylic polymers, nylon 6, polyamide-imide, polycarbonate, polyimide, polystyrene, etc.) and fiber reinforced composites (e.g., glass fiber reinforced polyimide). Frame section 20 and frame section 40 can be fabricated of the same material or different materials.

Sheet-like material layers 10 and 50 can be made of laminates of paper or textile with a melamine or other resin. Such laminates are sold under the trademarks or tradenames "Formica," "Arborite," "Micarta," "Wilsonart" and "Consoweld."

An advantage of the disclosed structure is that composite panels suitable for many office furniture applications can achieve suitable strength properties at a reduced weight (e.g., from about 1 lb/ft$^2$ to about 10 lb/ft$^2$).

The thickness of structural filler, and hence the distance or spacing between layers 10 and 50 can range from about 0.1 inches to about 1 inch (e.g., from about 0.25 inches to about 0.75 inches). The distance of overlap of layers 10 and 50, and sheet-like base section 20 from the peripheral edge inward can be from about 0.5 inches to 2 inches (e.g., from 0.5 inches to 1 inch).

Suitable adhesives for joining the components of the composite panel (e.g., bonding edges of layers 10 and 50 to sheet-like base 20) include various hot melt adhesives, thermoset adhesives, polyurethane adhesives, etc.

Although the invention has been explained in relation to its preferred embodiment, it is to be understood that many other possible modifications and variations can be made without departing from the spirit and scope of the invention.

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the claims attached herein.

The invention claimed is:

1. A composite panel, comprising:
a rigid plastic frame having outer edges that define a perimeter of the composite panel and inner edges defining a perimeter of a structural filler chamber, a thickness of the rigid frame being greater at the inner edges than at thinner outer edges;
a first sheet material layer bonded with a first side of the rigid frame;
a second sheet material layer bonded with an opposite second side of the rigid frame, the second sheet material layer having a flat top surface and ramped edge sections curved or sloped away from the top surface of the second sheet material and toward the thinner outer edges of the rigid frame, the first sheet material layer and the flat top surface of the second sheet material layer being substantially parallel and uniformly spaced apart and, together with the inner edges of the rigid frame, define the structural filler chamber;
a structure filler disposed in the structural filler chamber, the structural filler having a lower density than the rigid frame and the first and second sheet material layers, and a compressive strength sufficient to resist deformation of the sheet material layers when loads are applied to the sheet material layers in an area overlying the structural filler; and
wherein the structural filler has a density of from 20 kg/m$^3$ to 30 kg/m$^3$ and a compressive strength of from 50 kPa to 200 kPa.

2. The composite panel of claim 1, wherein the rigid frame is a unitary component.

3. The composite panel of claim 1, wherein the rigid plastic frame is made of a fiber reinforced thermoset composite.

4. The composite panel of claim 1, wherein the first sheet material layer and the second sheet material layer each have a thickness that is less than 10% of the length of the sheet material layer and less than 10% of the width of the sheet material layer.

5. The composite panel of claim 1, wherein a first edge of the panel is curved upwardly and an opposite second edge of the panel is curved downwardly.

6. The composite panel of claim 1, wherein the structural filler is a polymeric foam.

7. The composite panel of claim 1, wherein the rigid frame is made of material having a modulus of elasticity of 800,000 psi to 2,500,000 psi and a modulus of rupture of 5,000 psi to 15,000 psi.

8. A composite panel, comprising:
a rigid plastic frame having outer edges that define a perimeter of the composite panel and inner edges defining a perimeter of a structural filler chamber, a thickness of the rigid frame being greater at the inner edges than at thinner outer edges;
a first sheet material layer bonded with a first side of the rigid frame;
a second sheet material layer bonded with an opposite second side of the rigid frame, the second sheet material layer having a flat top surface and ramped edge sections curved or sloped away from the top surface of the second sheet material and toward the thinner outer edges of the rigid frame, the first sheet material layer and the flat top surface of the second sheet material layer being substantially parallel and uniformly spaced apart and, together with the inner edges of the rigid frame, define the structural filler chamber;
a structure filler disposed in the structural filler chamber, the structural filler having a lower density than the rigid frame and the first and second sheet material layers, and a compressive strength sufficient to resist deformation of the sheet material layers when loads are applied to the sheet material layers in an area overlying the structural filler; and
wherein the rigid frame is comprised of a first frame section defining a first opening and having a uniform thickness, and a second frame section defining a second opening, and wherein the first and second frame sections are joined together.

9. The composite panel of claim 8, wherein the first frame section includes an internal rib extending between opposite inner edges of the second opening.

10. A composite panel, comprising:
- a rigid plastic frame having outer edges that define a perimeter of the composite panel and inner edges defining a perimeter of a structural filler chamber, a thickness of the rigid frame being greater at the inner edges than at thinner outer edges;
- a first sheet material layer bonded with a first side of the rigid frame;
- a second sheet material layer bonded with an opposite second side of the rigid frame, the second sheet material layer having a flat top surface and ramped edge sections curved or sloped away from the top surface of the second sheet material and toward the thinner outer edges of the rigid frame, the first sheet material layer and the flat top surface of the second sheet material layer being substantially parallel and uniformly spaced apart and, together with the inner edges of the rigid frame, define the structural filler chamber;
- a structure filler disposed in the structural filler chamber, the structural filler having a lower density than the rigid frame and the first and second sheet material layers, and a compressive strength sufficient to resist deformation of the sheet material layers when loads are applied to the sheet material layers in an area overlying the structural filler, wherein at least one of the first and second sheet material layers is made of a laminate of paper or textile with melamine resin.

* * * * *